United States Patent [19]

O'Sullivan

[11] Patent Number: 5,493,608
[45] Date of Patent: Feb. 20, 1996

[54] CALLER ADAPTIVE VOICE RESPONSE SYSTEM

[75] Inventor: Daniel O'Sullivan, Setauket, N.Y.

[73] Assignee: Alpha Logic, Incorporated, Port Jefferson, N.Y.

[21] Appl. No.: 210,031

[22] Filed: Mar. 17, 1994

[51] Int. Cl.⁶ .................................................... H04M 1/64
[52] U.S. Cl. ................................ 379/88; 379/89; 379/67
[58] Field of Search ............................... 379/67, 88, 89, 379/72–77, 79–80; 381/43–44, 110, 51; 395/2.6, 2.84, 2.85, 2.79

[56] References Cited

U.S. PATENT DOCUMENTS

| | | | |
|---|---|---|---|
| 3,550,289 | 12/1970 | Orita et al. | 434/320 |
| 3,972,603 | 8/1976 | Lubinec | 381/76 X |
| 4,375,083 | 2/1983 | Maxemchuk | 379/88 |
| 4,618,936 | 10/1986 | Shiono | 395/2.79 |
| 4,692,817 | 9/1987 | Theis | 379/80 |
| 4,736,405 | 4/1988 | Akiyama | 379/89 |
| 4,747,125 | 5/1988 | Buchberger et al. | 379/67 |
| 4,792,968 | 12/1988 | Katz | 379/92 |
| 4,805,207 | 2/1989 | McNutt et al. | 379/89 |
| 4,823,374 | 4/1989 | Verlohr | 379/67 |
| 4,899,369 | 2/1990 | Kondziela | 379/101 |
| 5,073,929 | 12/1991 | Katz | 379/93 |
| 5,131,024 | 7/1992 | Pugh et al. | 379/67 |
| 5,153,579 | 10/1992 | Fisch et al. | 379/67 X |
| 5,199,062 | 3/1993 | Von Meister | 379/67 |
| 5,204,894 | 4/1993 | Darden | 379/88 |
| 5,357,596 | 10/1994 | Takebayashi et al. | 395/2.84 |

OTHER PUBLICATIONS

"Voice Programmer's Guide For MS–DOS," 1992 Diologic Corporation Worldwide Videotex.
"Diologic Offers Enhanced Firmware For Voice Boards", RBOC Update May 1992, vol. 3, No. 5.
"Diologic Introduces SpringWare", News Release, 7 Apr. 1992, p. 1 Product Design and Development.
"Diologic Offers Call–in Demonstration", Audiotex Update, Oct. 1992 vol. 4, No. 10.
"Text to Speech Synthesis For Pronouncing Names and Addresses in a Telecommunications Service: Designing the User Interference" Kashan et al., . . . Proceeding of AVIOS Systems Application Conference, Sep. 1986 pp. 1–7.
"Serving Customers with Automotic Speech Recognition–Human Factors Issues" Wattenberger et al., AT&T Technical Journal, May/Jun. 1993 pp. 28–41.

*Primary Examiner*—Jeffery A. Hofsass
*Assistant Examiner*—Scott L. Weaver
*Attorney, Agent, or Firm*—Cohen, Pontani, Lieberman, Pavane

[57] ABSTRACT

A interactive voice response system that automatically adapts to suit the speed at which the caller interacts with the system. The caller interacts with the system utilizing the keypad buttons on a DTMF-type telephone or by speaking verbal instructions over any type of telephone, and hears spoken instructions and information over the telephone in response to those entries. The system is programmed to measure the response times of the caller and adjust the playing speed of the application dialogue's voice messages accordingly using a caller adaptive response algorithm incorporated into the application software of the voice response system. If the caller is responding relatively fast and without error to the voice message prompts, the caller adaptive response algorithm software will gradually speed up subsequent voice message prompts to a preset, reasonable maximum speech rate. If the caller is responding more slowly to the voice message prompts or is making errors in their responses, the caller adaptive response algorithm software will slow down subsequent voice message prompts to a reasonable, preset minimum speech rate. This process continues throughout the application dialogue such that said system is always closely approximating the natural conversational pace of the caller.

39 Claims, 3 Drawing Sheets

CALLER ADAPTIVE VOICE RESPONSE SYSTEM

BACKGROUND OF THE INVENTION

1. Field Of The Invention

This invention pertains to information dissemination systems, and particularly to interactive voice response systems wherein users communicate with a computer over conventional telephone lines.

2. Prior Art

It is the nature of many businesses that they receive many telephone inquiries from customers, potential customers and other businesses. Obviously, if each call is answered by an operator, a sufficient number of operators must be available to answer calls as they are received. The expense of doing this is obvious. Moreover, almost invariably there are peak times when the number of callers exceeds the number of operators. When this happens, many of the calls must be queued. The queue time can often become so long that many callers will hang up in frustration, perhaps never to call again. This results in a significant loss of business and corporate image.

A further problem with operators is that many of today's callers would rather not deal with other people when they have a choice to also use an automated system. As evidenced by the recent popularity of automated teller machines, people often prefer to transact business with a machine at their own pace rather than with a human operator.

Recognizing these problems, others have proposed voice announcement systems wherein a caller accesses a single pre-recorded message. The caller dials a telephone number specific to that service, listens to the message and then hangs up or is disconnected. Examples of these systems include sports information and lottery number pay per call services. Yet others have proposed voice response systems wherein the caller interacts with the system by either pressing the telephone Touch-Tone® "(a registered trademark of AT&T)" keys or speaking directly into the telephone mouthpiece in response to voice message prompts. Typical examples of these are stock quote systems, transit information systems, call routing systems, local weather and news systems. Certain voice response systems will allow a caller to leave a voice message for a particular party. These are known as voice mail and voice messaging systems.

Known voice response systems all operate by prompting the caller with a voice message prompt spoken by the system instructing the caller to enter either a single touch-tone, multiple touch-tones or to speak a response. Once the voice response system has prompted the caller with a voice message prompt, it then waits a pre-determined amount of time to allow the caller to respond. This is generally on the order of three to five seconds. If the caller responds within the set response time period, the voice response systems application program proceeds to the next level by prompting the caller with the next voice message prompt in the application dialogue. This process is repeated until the caller receives the information he or she wants, hangs up or is disconnected by the voice response system.

If a caller makes an error in response to a voice message prompt or does not enter a response within the set response time, the voice response systems will generally repeat the voice message prompt and ask the caller to try again. If the caller again does not respond within the response time, the voice response system will generally forward the caller to an operator for assistance.

All stored voice messages for known voice response systems are recorded off line either by the voice response systems itself or by another voice response system. This is generally done by recording the human voice as it speaks the content of each voice message to be used in the application. The pace at which each voice message is recorded is generally set to a known comfortable dialogue pace in terms of words per minute spoken. Most importantly, all voice messages on known voice response systems are recorded and played back to the caller at a constant words per minute speaking rate.

As such, known voice response systems prompt tile caller by speaking a voice message prompt at a fixed words per minute rate and waiting a fixed amount of time for a response from the caller. Callers can interrupt the voice response systems voice message before it ends if they know the response before listening to the end of the voice message as is often the case. However this will just bring them to the next level of the voice response systems dialogue where the next voice message will be spoken at the same rate as the previous voice message, indeed at the same rate of all voice messages. This is a fixed rate voice response system where the recorded and playback speed of all voice messages in the system are constant.

While the words per minute speaking rate of these messages is generally set to a level that is understandable by most callers, it does not make any allowances for the individual, natural conversation pace of the varied array of callers a voice response system must deal with. Also, since many callers, having used a particular voice response system application before will be able to proceed through a known dialogue faster, it is desirable not only to have the voice response systems voice messages interruptable by the caller as is possible with existing voice response systems, but it is also a great advantage to allow callers that can hear and understand the instructions embedded within the voice messages at a faster rate to hear those same voice messages at an increasingly faster rate.

SUMMARY OF THE INVENTION

Broadly speaking, the invention comprises a hardware and software based interactive voice response system that adapts to the natural conversational pace of the caller. The caller interacts with the system utilizing the keypad buttons on a DTMF-type telephone or by speaking verbal instructions over any type of telephone, and hears spoken instructions and information over the telephone in response to those entries.

The system is capable of being programmed to execute any voice response system application dialogue including but not limited to voice mail, call attendant, entertainment and travel information, order inquiry, financial and brokerage information, news, weather and sports information. In fact, any voice response systems that elicits a response from the caller can benefit from the caller adaptive response algorithm.

The caller adaptive voice response system is actually a conventional voice response system which is programmed to measure the response times of the caller and adjust the playing speed of the application dialogue's voice messages accordingly. This is accomplished by using a caller adaptive response algorithm which is incorporated into the application software of the voice response system. The caller adaptive response algorithm software operates by measuring the amount of time a caller takes to respond to a given voice message prompt or set of voice message prompts during the call dialogue. If the caller is responding relatively fast and without error to the voice message prompts, the caller adaptive response algorithm software will gradually speed up subsequent voice message prompts to a preset, reasonable maximum speech rate. If the caller is responding more slowly to the voice message prompts or is making errors in their responses, the caller adaptive response algorithm software will slow down subsequent voice message prompts to a reasonable, preset minimum speech rate. This process continues throughout the voice response systems application dialogue such that the system is always closely approximating the natural conversational pace of the caller.

A first object of this invention is to reduce telecommunications costs associated with unduly long call duration times of conventional voice response systems. Since conventional voice response systems speak voice messages at fixed rates, no allowances are made for the individual speaking rates of callers. Voice messages on conventional voice response systems are generally first recorded and then spoken at moderate speeds in an attempt to satisfy most callers. However, many callers will desire to proceed through the voice response systems dialogue at a faster rate and have no way to speed up the pace of the voice messages on such conventional voice response systems. Therefore, it is an object of the present invention to reduce recurring telephone toll charges by reducing the amount of time it takes for the voice response systems to handle a given call.

A second object of the present invention is to reduce the amount of voice response system hardware it takes to handle a given number of telephone calls in a given time period. Since the caller adaptive response algorithm software effectively speeds up the call handling process and call duration is therefore reduced, a greater number of calls can be handled on a given set of telephone lines in the same amount of time. Or, if desired, the same number of telephone calls can be handled with fewer telephone lines and less voice response system hardware. This results in significant cost savings in both recurring telephone line charges and one time voice response systems equipment charges.

A third object of the present invention is to promote caller usage of a particular voice response system application. Since a voice response system using the caller adaptive response algorithm software automatically matches or closely approximates the natural conversational pace of the caller, the caller will feel more comfortable than with a voice response system that progresses at a fixed conversational rate no matter what. This advantage is evidenced by the discomfort people experience when one person is speaking at a slow relaxed rate while the other prefers to proceed faster. This is generally discomforting for both parties. The caller adaptive voice response system overcomes this problem by automatically listening for the pace at which each caller responds, and responding accordingly.

The system is capable of being programmed to execute any voice response system application dialogue including but not limited to voice mail, call attendant, entertainment and travel information, order inquiry, financial and brokerage information, news, weather and sports information.

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

DETAILED DESCRIPTION OF THE PREFERRED EMBODIMENT

Figure 1:
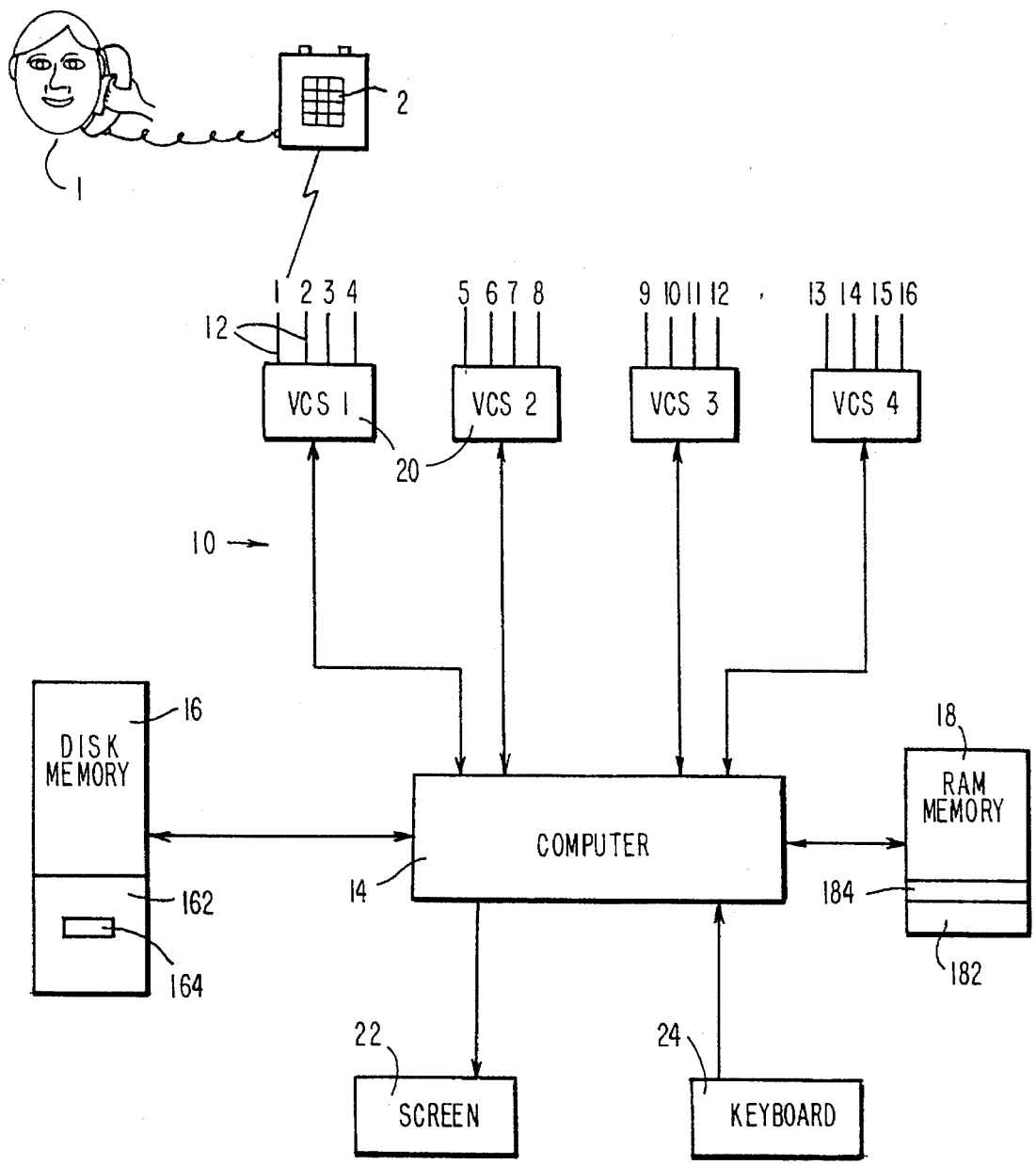
FIG. 1 is a diagrammatic representation of the caller adaptive voice response system in accordance with the present invention.

Referring now to the drawings, and initially to FIG. 1 thereof, a diagrammatic representation of the caller adaptive voice response system in accordance with the invention is generally designated at 10. The system 10 is capable of simultaneously handling up to 16 individual callers on incoming lines 12. However, the system 10, due to its modular nature, may be expanded to handle any number of incoming calls simultaneously.

The preferred embodiment of the system 10 employs a computer, preferably an IBM PC based personal computer or equivalent, generally designated at 14. As shown in FIG. 1, the computer 14 includes a 200M hard drive 16 and 4MB of RAM 18. The telephone lines 12 communicate with the computer 14 through interface circuit boards 20, four of which are shown in FIG. 1, each of which is capable of handling up to four phone lines. The interface circuit boards 20 are conventional and may comprise, for example a Dialogic D/41D Multiline Voice Communications System board as manufactured by Dialogic Corporation, Parsippany, N.J. These boards 20 are designed for installation in the expansion slots available in the computer 14 and include appropriate connectors accessible from the back of computer 14 for connection to the phone lines 12. The manner for interfacing the system 10 with various phone systems, such as PBX and ACD systems, will be readily apparent to those of ordinary skill in the art.

The operation of each board 20 is controlled by an application program 182 resident on the RAM 18 of the computer 14. When so controlled, each board 20 is capable of sensing the status of each incoming line 12 thereto, answering any ringing line by simulating an off-hook condition, converting any DTMF tones received over an incoming line to a digital format, converting an analog speech signal to a digital format and vice versa and terminating a call by creating an on-hook condition for a specific line. Since the specific circuitry and software for accomplishing these objectives on the boards 20 is well known to those of ordinary skill in the art, a further description thereof is deemed unnecessary. Suffice it to say that the proper operation of the boards 20 in the system 10 to achieve system 10 objectives is possible only through control of the boards 20 by the aforementioned application program 182 resident in RAM 18.

In the boards 20 the hard disk 16 and RAM 18 are resident within the housing of the computer 14. They are shown as separate elements in FIG. 1 solely for the purposes of illustration. Also illustrated in FIG. 1 are a CRT screen 22 and a keyboard 24 both of which are compatible with the computer 14.

Stored in a database 162 at specific addressable memory locations on the hard disk 16 are a plurality of digitally recorded and encoded speech files 164. Each speech file 164 comprises a word or phrase. These speech files 164 are generated off-line by the system 10 and stored in predetermined accessible memory locations on the hard disk 16. The process for accomplishing these objectives is well known by those of ordinary skill in the art and a further description thereof is deemed unnecessary. Suffice to say that as many speech files 164 as are necessary by the application program 182 to execute the application dialogue are recorded and stored digitally on the hard disk 16. Subsequently, when the system 10 is on-line and the application program 182 is running, application program 182 can access and play any of the speech files 164 by routing same to the desired board 20.

Figure 2:
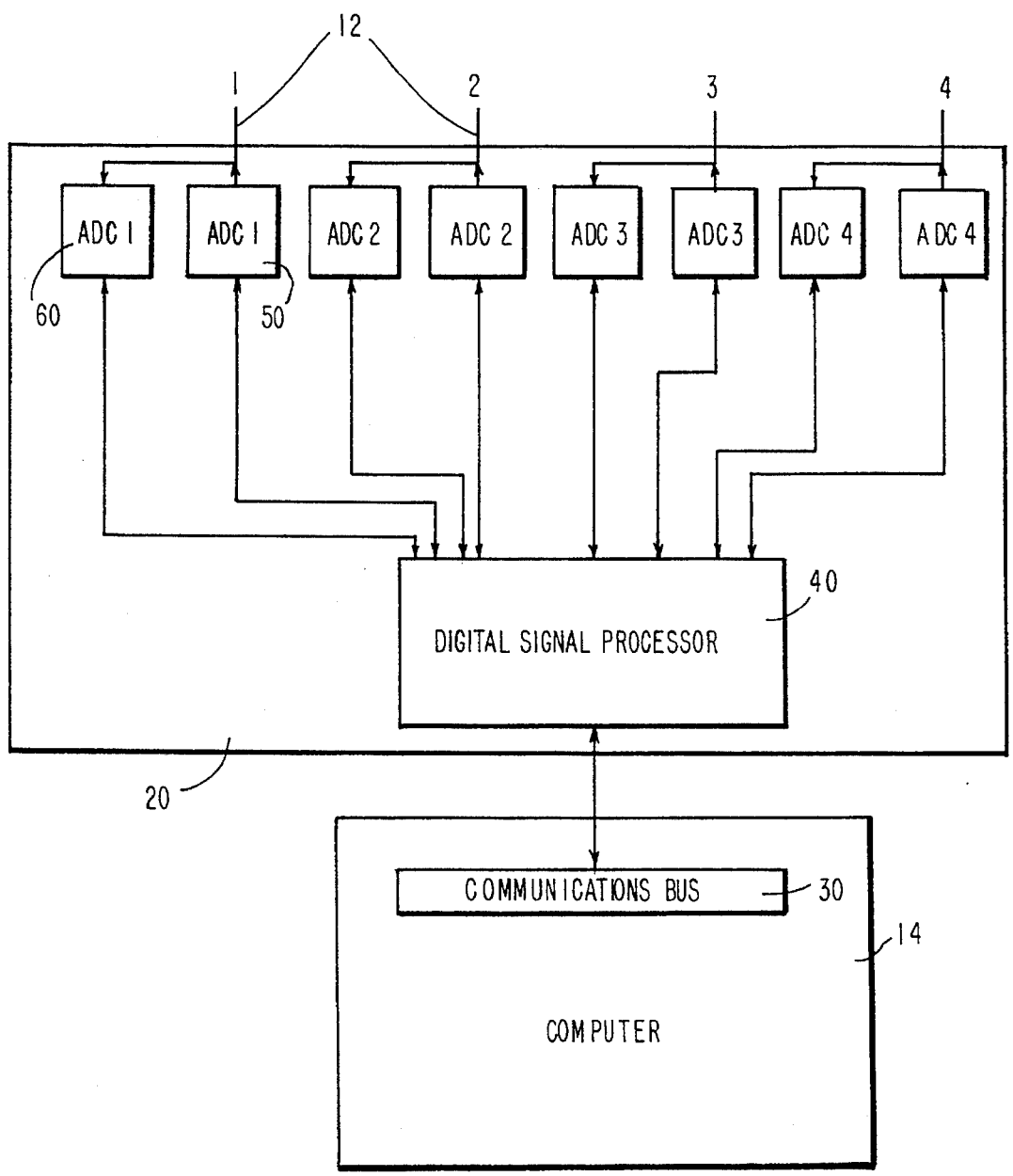
FIG. 2 is a diagrammatic representation of the interactive voice response interface portion of the present invention.

As shown in FIG.2, the selected speech files 164 are routed by the computer 14 through the communications bus 30 to the digital signal processor 40. The digital signal processor 40 then controls how the speech files 164 to be played are transmitted to the desired digital to analog converter 50. The digital to analog converter 50 for the selected line 12, then converts the digital speech files 164 to analog form and transmits this analog data in the form of speech to the selected line 12.

The computer 14 and communications bus 30 of FIG.2 are components of the computer 14 while the digital signal processor 40 and digital to analog converters 50 are components of the boards 20. They are combined as elements in FIG.2 for the purposes of illustration only.

An important feature of the digital signal processor 40 is its ability to vary the rate at which the digitized data representing the speech files 164 is presented to the digital to analog converters 50 for conversion under control of the application program 182. The application program 182 can instruct the digital signal processor 40 to increase or decrease the rate at which it presents this data to the digital to analog converters 50 using the computer 14 application level and operating system level commands. This allows the application program 182 to effectively control the rate at which the speech files 164 are spoken to the caller.

When a caller 1 depresses a button on the telephone keypad 2 or speaks a response into the telephone mouthpiece, the analog to digital converters 60 detects this response and notifies the application program 182 via the digital signal processor 40, communications bus 30 and computer 14. The caller adaptive response algorithm 184 resident within application program 182 tells said application program 182 how long it took for a caller to respond to a given speech file 164. This process allows the application program 182 to determine how fast or how slow a caller is responding as the application dialog is executed.

Figure 3:
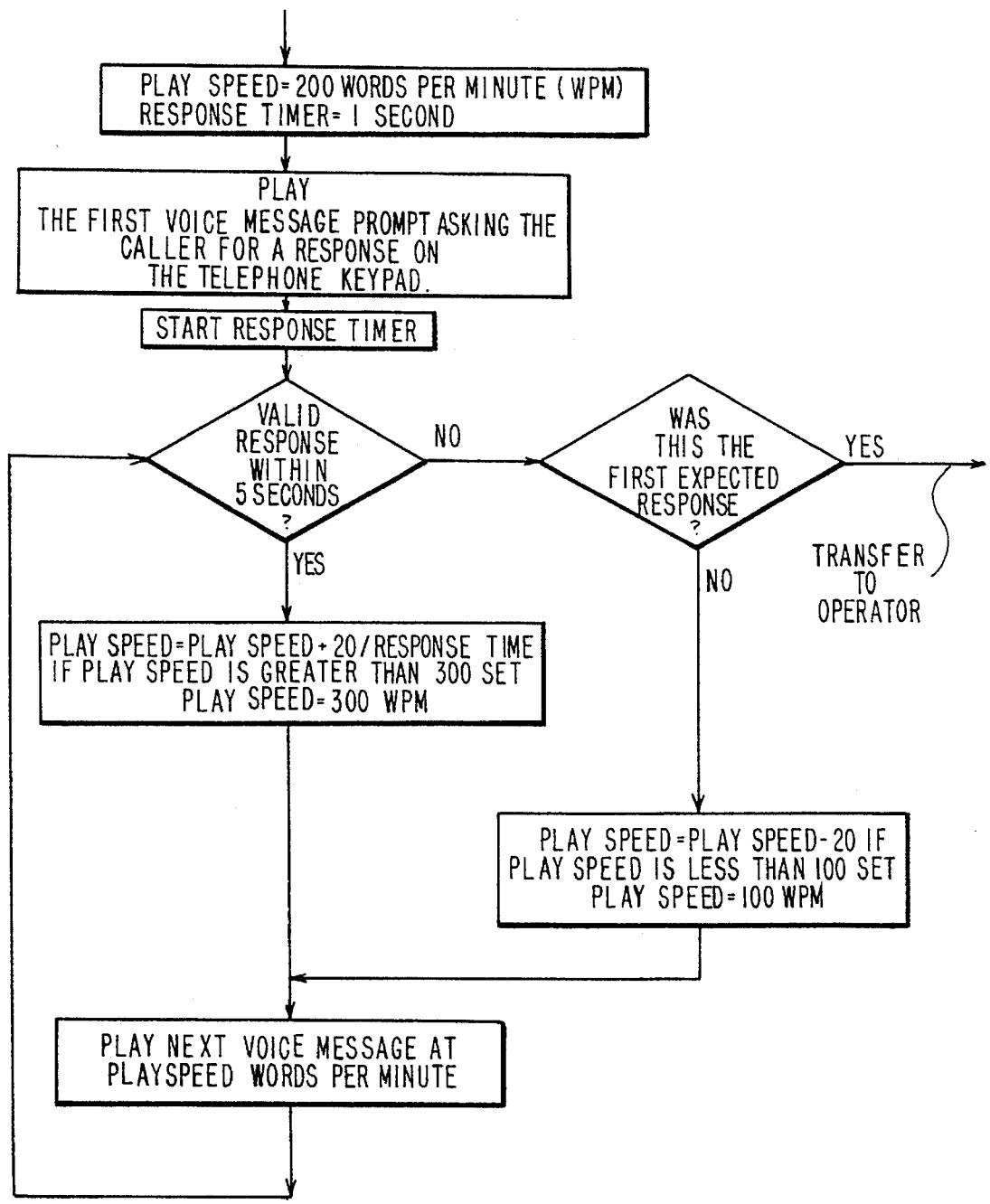
FIG. 3 is flowchart of the caller adaptive response algorithm as incorporated in the present invention.

FIG. 3 depicts how the application program 182 uses this information to achieve the objects of the present invention. FIG. 3 describes the flow of the caller adaptive response algorithm 184 which is embedded within the application program 182 resident in RAM 18 at run time. When a caller rings the system 10 over a line 12, the call is answered by corresponding board 20 creating an off-hook condition. Each of the 16 lines 12 are identifiable by the application program 182 and said application program 182 will cause the caller adaptive response algorithm 184 to immediately set the software variables designated PLAY SPEED equal to 200 and RESPONSE TIMER equal to one. The PLAY SPEED variable corresponds to the speed at which the next voice message or voice message prompt will be played, which in this instance will be 200 words per minute. The RESPONSE TIMER variable corresponds to the amount of time it takes for a caller to respond to the previous voice message prompt in seconds. If a caller responds immediately after the system 10 completes speaking the last word of the last voice message prompt or if the caller interrupts the system 10 while it is speaking the last voice message prompt, the RESPONSE TIMER is set to its minimal value of one. The application program 182 then accesses and plays the first voice message prompt to be played on the telephone line 12 upon which the caller called in as shown at the top of FIG.3.

The application program 182 starts the response timer immediately upon completion of playing the first voice message prompt if the caller has not already interrupted said first voice message prompt, and waits for a response from the caller. If there is no response within a predetermined time interval, such as five seconds, for example, the caller is transferred to a human operator as shown in the right side of FIG.3. This allows callers using rotary dial telephones or callers that do not wish to use the system to have their call answered by a person instead. If there is a response from the caller to the first voice message prompt, the application program 182 stops the response timer. The application program 182 now knows how long it took for the caller to respond to the first voice message. As indicated above, if the caller had interrupted the first voice message with a response prior to the completion of said first voice message being played, the response timer would remain at its minimal value of one. Provided there was a valid response received from the caller within the allowed time interval (e.g., five seconds), the caller adaptive response algorithm 184 next computes the playing speed of the next voice message or voice message prompt in the application dialogue by adding to the current value of the PLAY SPEED variable the value of twenty divided by the response time in whole seconds. It should be noted that the response time value is always the fractionally truncated value of the actual response time plus one. This simplifies using the RESPONSE TIMER as a divisor in the formula for calculation of the new PLAY SPEED. If therefore, as shown in the central part of FIG.3, the RESPONSE TIMER to the first voice message prompt was 2.6 seconds, the new value for PLAY SPEED would be 205 words per minute which is 200 plus 20 divided by 4 seconds.

As can be seen from the formula for calculating the PLAY SPEED as the time within which a response is received (response time) decreases, or, otherwise stated, as the user's response to spoken prompts becomes quicker, the value of the PLAY SPEED variable increases, which in turn increases the speed at which the next voice message or voice message prompt is played. If however, as shown in the right, center part of FIG.3, there is no response from the caller to a particular voice message or voice message prompt, or if the caller responds in error, the value of PLAY SPEED is reduced by twenty thereby reducing the speed at which the next message is played at by twenty words per minute.

This process of increasing and decreasing the playing speed of the voice messages is continually adjusted by the caller adaptive response algorithm in the manner described above until completion of the application dialogue.

The invention is not limited by the embodiments described above which are presented as examples only but can be modified in various ways within the scope of protection defined by the appended patent claims.

I claim:

1. A caller adaptive voice response system which adapts to a conversational pace of a caller, comprising:

(a) means for measuring an amount of time indicative of the time required for said caller to respond to a voice message spoken by said system at a predetermined speaking rate; and (b) means for adjusting a subsequent speaking rate of a subsequent voice message to be spoken by said system, said adjusting means being responsive to said measuring means so as to increase said subsequent speaking rate of said subsequent voice message if said amount of time was shorter in duration than a first predetermined amount of time.

2. The apparatus according to claim 1 further comprising:

means for determining if a caller response is an expected response and thereby a valid response and determining if a caller response is not a valid response and therefore an erroneous response; and means for decreasing said speaking rate of said subsequent voice message if said caller performs an action selected from a group consisting of no response and an erroneous response to said voice message preceding said subsequent voice message.

3. The apparatus according to claim 1, wherein said system speaks a plurality of voice messages in a predetermined order, and wherein said measuring means measures said amount of time required for said caller to respond to each one of said plurality of voice messages spoken by said system, and wherein said adjusting means adjusts the speaking rate of each one voice message of said plurality of voice messages in accordance with said amount of time required for said caller to respond to the one voice message which immediately preceded the one voice message to be next spoken by said system.

4. The apparatus of claim 1, further including means for storing a plurality of speech file database portions, each speech file database portion of said plurality being recorded at different speaking rates, and wherein said adjusting means adjusts said subsequent speaking rate by accessing a speech file to be spoken by the system from a selected one of said speech file database portions of said plurality in accordance with said amount of time measured by said measuring means.

5. The apparatus of claim 1, wherein said caller is prompted, by a prompt spoken by the system and selected from a group comprising said voice message and said subsequent voice message, to respond to said system by depressing at least one button on a DTMF-type telephone keypad associated with a telephone being used by said caller to call said system.

6. The apparatus of claim 1, wherein said caller is prompted, by a prompt spoken by the system and selected from a group comprising said voice message and said subsequent voice message, to respond to said system by speaking at least one word into a telephone being used by said caller to call said system.

7. The apparatus according to claim 1, further comprising means for decreasing said subsequent speaking rate of said subsequent voice message if said amount of time was longer in duration than a second predetermined amount of time.

8. A method of adapting a voice response system to a conversational pace of a caller, comprising the steps of:

measuring an amount of time indicative of the time required for said caller to respond to a voice message spoken by the system at a predetermined speaking rate; and adjusting, in accordance with the caller response time measurement obtained during said measuring step, a subsequent speaking rate of a subsequent voice message to be subsequently spoken by the system.

9. The method according to claim 8, wherein said adjusting step includes increasing said subsequent speaking rate of said subsequent voice message if said caller response time measured in said measuring step was shorter in duration than a first predetermined amount of time.

10. The method according to claim 9, wherein said adjusting step includes decreasing said subsequent speaking rate of said subsequent voice message if said caller response time measured in said measuring step was longer in duration than a second predetermined amount of time.

11. The method according to claim 8, wherein said adjusting step includes decreasing said subsequent speaking rate of said subsequent voice message if said caller response time measured in said measuring step was longer in duration than a predetermined amount of time.

12. The method according to claim 8, wherein said voice message of said measuring step is the first prompt spoken by said system.

13. The method according to claim 8, wherein said measuring step is repeated for each caller response to a plurality of voice messages, and a subsequent speaking rate for each of a plurality of subsequent voice messages is adjusted by said adjusting step in response to the immediately preceding caller response time measurement performed during said measuring step.

14. The method according to claim 8, further including the steps of:

determining if a caller response is an expected response and is thereby a valid response;

determining if a caller response is not a valid response and is therefore an erroneous response; and decreasing said subsequent speaking rate of said subsequent voice message if said caller performs an action selected from a group consisting of no response or an erroneous response to a voice message which precedes said subsequent voice message.

15. A caller adaptive telephonic voice response system capable of interacting via a telephone line with a caller by generating voice messages recognizable by said caller as audible speech spoken at a predetermined speaking rate and by detecting a response from said caller to said voice message within a variable response time interval, the system comprising:

(a) means for generating over said telephone line at least one voice message recognizable by said caller as audible speech spoken at an initial predetermined speaking rate and for generating over said telephone line at least one subsequent voice message recognizable by said caller as audible speech spoken at a subsequent predetermined speaking rate, said subsequent voice message being generated by said system subsequent to said voice message;

(b) means for detecting over said telephone line a response from said caller;

(c) means for measuring said variable response time interval, said variable response time interval being indicative of the elapsed time between the end of a voice message most recently spoken by said system and the detection of said response from said caller to said most recently spoken voice message; and (d) means for adjusting said initial predetermined speaking rate to said subsequent predetermined speaking rate, said adjusting means being responsive to said measuring means so as to adjust said subsequent predetermined speaking rate to a rate higher than said initial predetermined speaking rate if said variable response time interval is shorter in duration than a first predetermined amount of time.

16. An apparatus according to claim 15, wherein said adjusting means adjusts said subsequent predetermined speaking rate to a rate lower than said initial predetermined speaking rate if said variable response time interval is longer in duration than a second predetermined amount of time.

17. An apparatus according to claim 15 further comprising means for determining if a caller response is an expected response and thereby a valid response and determining if a caller response is not a valid response and therefore an erroneous response, and wherein said adjusting means is further responsive to said detecting means so as to adjust said subsequent predetermined speaking rate to a rate lower than said initial predetermined speaking rate if said caller performs an action selected from a group consisting of no response and an erroneous response.

18. An apparatus according to claim 16, wherein said first predetermined amount of time and said second predetermined amount of time are equal.

19. An apparatus according to claim 15, further comprising means for measuring a second variable response time indicative of the elapsed time between the end of said subsequent voice message and the detection of a response from said caller to said subsequent voice message, and wherein said adjusting means adjusts the speaking rate of a further subsequent voice message spoken after said subsequent voice message in accordance with said second variable response time interval.

20. An apparatus according to claim 15, wherein said adjusting means comprises:
   (a) a plurality of pre-recorded speech file database portions containing a plurality of pre-recorded speech files having verbal contents and from which a voice message may be generated by said generating means at a database portion-specific preselected speaking rate, the verbal content of each of said pre-recorded speech file database portion being recorded at different database portion-specific preselected speaking rates; and
   (b) means for controllably selecting from said plurality of database portions a pre-recorded speech file database portion which has a database portion-specific speaking rate closest in value to said subsequent predetermined speaking rate; and
   wherein said generating means generates said subsequent voice message from said pre-recorded speech file database portion selected by said selecting means.

21. An apparatus according to claim 15, wherein said caller is instructed by at least one of said voice messages to respond to said system by depressing at least one button on a DTMF-type telephone keypad of a telephone being used by said caller to interact with said system.

22. An apparatus according to claim 15, wherein said caller is instructed by at least one of said voice messages to respond to said system by speaking at least one verbal utterance into a telephone being used by said caller to interact with said system.

23. An apparatus according to claim 15, wherein said adjusting means further comprises means for determining said subsequent predetermined speaking rate, said determining means comprising:
   (a) means for increasing said subsequent predetermined speaking rate to a rate higher than said initial predetermined speaking rate, said increasing means comprising:
      (i) means for adding the numerical value one to the numerical value of said variable response time interval to arrive at a sum;
      (ii) means for modifying said sum if said sum is a fractional value by increasing the value of said sum to the next highest whole number to obtain a modified sum;
      (iii) means for dividing a first predetermined fixed number by a divisor selected from a group consisting of said sum and said modified sum to arrive at a numerical value to be added; and
      (iv) means for adding said numerical value to be added to a numerical value equal to an average number of words per minute spoken by said system at said initial predetermined speaking rate to arrive at a second numerical value;
      (v) means for setting an average number of words per minute spoken by said system at said subsequent predetermined speaking rate to said second numerical value; and
      (vi) means for limiting said subsequent predetermined speaking rate to a maximum speaking rate.

24. An apparatus according to claim 23, further comprising means for decreasing said subsequent predetermined speaking rate to a rate lower than said initial predetermined speaking rate, said decreasing means comprising:
   (i) means for reducing said initial predetermined speaking rate by a predetermined fixed number of words per minute to arrive at said subsequent predetermined speaking rate; and
   (ii) means for limiting said subsequent predetermined speaking rate to a minimum speaking rate.

25. An apparatus according to claim 23, wherein said determining means is a software program operating in a general purpose digital computer.

26. An apparatus according to claim 24, wherein said initial predetermined speaking rate is approximately 200 words per minute, said first predetermined amount of time is approximately 5 seconds, said second predetermined amount of time is approximately 5 seconds, said maximum speaking rate is approximately 300 words per minute, said first predetermined fixed number is approximately 20, said predetermined fixed number of words per minute is approximately 20, and said minimum speaking rate is approximately 100 words per minute.

27. A method of adapting a caller adaptive telephonic voice response system capable of interacting via a telephone line with a caller by generating voice messages recognizable by the caller as audible speech spoken at a predetermined speaking rate and by detecting a response from said caller to said voice message within a variable response time interval, the method comprising:
   (a) generating over said telephone line a first voice message recognizable by said caller as audible speech spoken at an initial predetermined speaking rate;
   (b) detecting over said telephone line a response from said caller to said first voice message;
   (c) measuring as said variable response time interval a time interval indicative of the elapsed time between the end of said first voice message generated in step (a) and the detection of step (b);
   (d) generating over said telephone line at least one subsequent voice message recognizable by said caller as audible speech spoken at a subsequent predetermined speaking rate, said subsequent voice message being generated by said system subsequent to said first voice message; and (e) adjusting said initial predetermined speaking rate to said subsequent predetermined speaking rate in response to said variable response time interval measured in step (c) so as to adjust said subsequent predetermined speaking rate to a rate higher than said initial predetermined speaking rate if said variable response time interval is shorter in duration than a first predetermined amount of time.

28. A method according to claim 27 wherein said adjusting step further adjusts said subsequent predetermined speaking rate to a rate lower than said initial predetermined speaking rate if said variable response time interval is longer in duration than a second predetermined amount of time.

29. A method according to claim 28 further comprising the steps of determining if said caller response is an expected response and thereby a valid response, and determining if said caller response is not a valid response and therefore an erroneous response, and wherein said adjusting step further comprises adjusting said subsequent predetermined speaking rate to said rate lower than said initial predetermined speaking rate if said caller performs an action selected from a group consisting of no response and an erroneous response.

30. A method according to claim 27, wherein said adjusting step adjusts said subsequent predetermined speaking rate of said subsequent voice message in accordance with said variable response time interval of a caller response measured immediately prior to said system speaking said subsequent voice message.

31. A method according to claim 27, wherein said step (e) comprises:
(i) storing a plurality of pre-recorded speech file database portions containing a plurality of pre-recorded speech files having verbal contents and from which a voice message may be generated at a database portion-specific preselected speaking rate, the verbal contents of each of said pre-recorded speech file database portions being recorded at different database portion-specific preselected speaking rates;
(ii) controllably selecting from said plurality of pre-recorded speech file database portions a pre-recorded speech file database portion having a database portion-specific speaking rate closest in value to said subsequent predetermined speaking rate; and
wherein said step (d) comprises generating said subsequent voice message from said pre-recorded speech file database portion selected in said step (ii).

32. A method according to claim 27, further comprising the step of instructing said caller, by at least one of said voice messages, to respond to said system by depressing at least one button on a DTMF-type telephone keypad associated with a telephone being used by said caller to call said system.

33. A method according to claim 27, further comprising the step of instructing said caller, by at least one of said voice messages, to respond to the system by speaking at least one verbal utterance into a telephone being used by said caller to call said system.

34. A method according to claim 27, wherein said adjusting step further comprises:
(i) increasing said subsequent predetermined speaking rate to a rate higher than said initial predetermined speaking rate by:
(1) adding a predetermined numerical value to the numerical value of said variable response time interval to arrive at a sum;
(2) modifying said sum if said sum is a fractional value by increasing the value of said sum to the next highest whole number to obtain a modified sum;
(3) dividing a first predetermined fixed number by a divisor selected from a group consisting of said sum and said modified sum to arrive at a numerical value to be added;
(4) adding said numerical value to be added to a numerical value equal to an average number of words per minute spoken by said system at said initial predetermined speaking rate to arrive at a second numerical value;
(5) setting an average number of words per minute to be spoken by said system at said subsequent predetermined speaking rate to said second numerical value; and
(6) limiting said subsequent predetermined speaking rate to a maximum speaking rate.

35. A method according to claim 28, wherein said adjusting step further comprises:
(i) decreasing said subsequent predetermined speaking rate to a rate lower than said initial predetermined speaking rate by:
(1) reducing said initial predetermined speaking rate by a predetermined fixed number of words per minute to arrive at said subsequent predetermined speaking rate; and
(2) limiting said subsequent predetermined speaking rate to a minimum speaking rate.

36. A method according to claim 34, wherein said steps (1) through (5) are performed by a software program operating in a general purpose digital computer.

37. A method according to claim 35, wherein said steps (1) and (2) are performed by a software program operating in a general purpose digital computer.

38. A method according to claim 34, wherein said initial predetermined speaking rate is approximately 200 words per minute, said predetermined value is 1, said first predetermined amount of time is approximately 5 seconds, said maximum speaking rate is approximately 300 words per minute, and said first predetermined fixed number is approximately 20.

39. A method according to claim 35, wherein said initial predetermined speaking rate is approximately 200 words per minute, said predetermined expected amount of time is approximately 5 seconds, said predetermined fixed number of words per minute is approximately 20, and said minimum speaking rate is 100 words per minute.

* * * * *